Feb. 24, 1931.　　　　G. RAYMOND　　　　1,793,510
CLARIFYING APPARATUS
Filed July 5, 1928
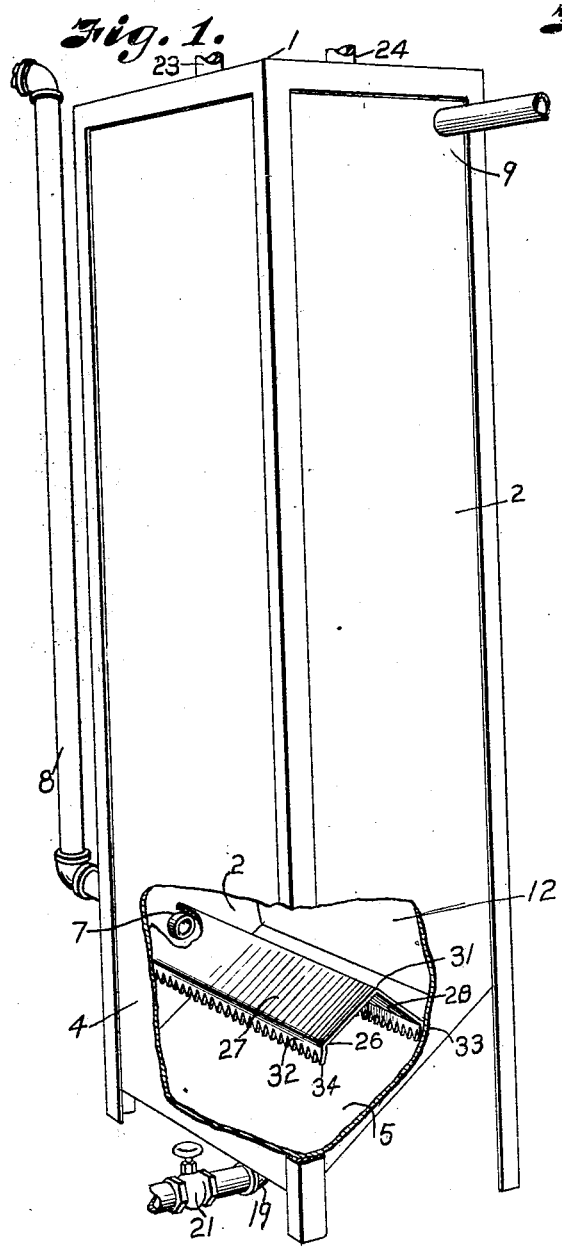
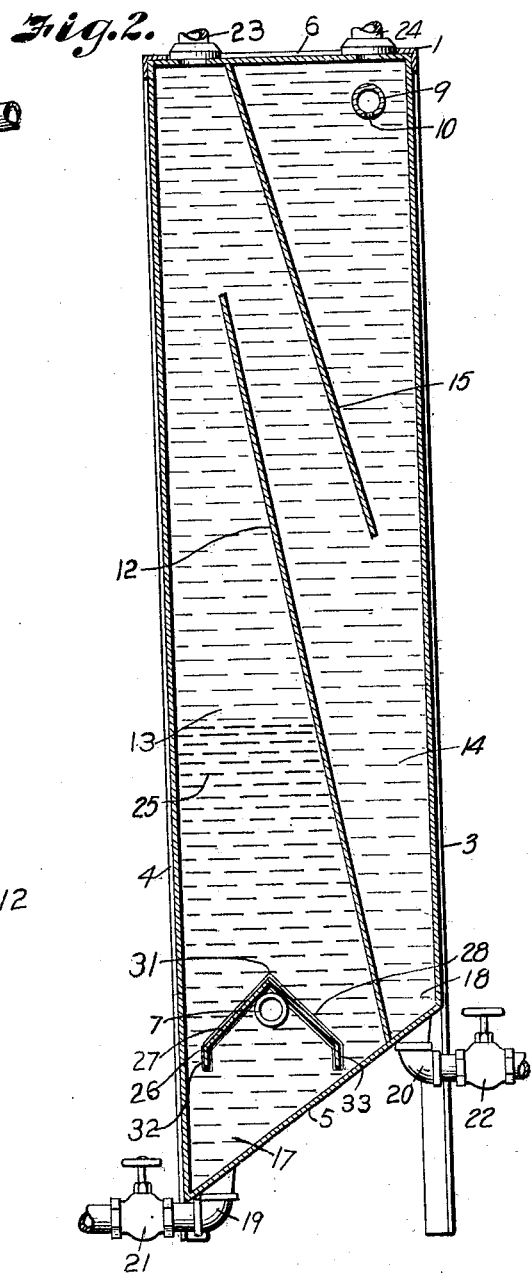
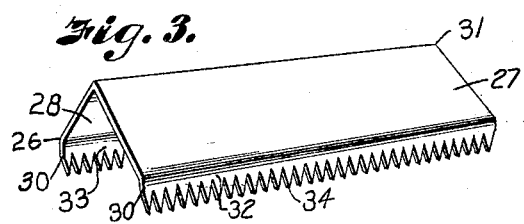
INVENTOR.
Gwynne Raymond.
BY
ATTORNEYS.

Patented Feb. 24, 1931

1,793,510

UNITED STATES PATENT OFFICE

GWYNNE RAYMOND, OF KANSAS CITY, MISSOURI

CLARIFYING APPARATUS

Application filed July 5, 1928. Serial No. 290,439.

My invention relates to clarifying or purifying apparatus for use in dry cleaning systems or the like, and more particularly to apparatus for clarifying materials such as gasoline, naphtha and cleaning solvents, the principal objects of the invention being to cause the material to contact the maximum amount of the clarifying medium and bring all of the material into contact with the clarifying medium without excessive agitation of the material or clarifying medium.

Further objects are to reduce the inlet speed of the solvent stream and increase its area previously to contact with the cleaning medium; to introduce the solvent into the cleaning medium in a plurality of streams, and to restrain the solvent for even distribution to the cleaning medium.

In accomplishing these and other objects of the invention, I have provided improved details of structure, the preferred forms of which are illustrated in the accompanying drawings, wherein:

Fig. 1 is a perspective view partly broken away of a clarifying vessel illustrating a distributor embodying my invention installed therein.

Fig. 2 is a vertical sectional view through the same.

Fig. 3 is a detail perspective view of the distributor.

Referring in detail to the drawings:

1 designates a vessel comprising a tank having side walls 2, rear and front walls 3—4, a bottom 5 preferably inclined downwardly toward the front wall 4, and a top 6. The invention will be illustrated and described as applied to the clarification of a solvent lighter than the clarifying medium, and for this use an inlet 7 from a supply line 8 is fixed in a side wall near the lower end of the tank, and an outlet pipe 9 extends across the tank near its upper end and is provided with a downwardly facing slot 10 in the portion within the tank.

A baffle member 12 fixed to the bottom 5 and side walls 2 of the tank extends upwardly preferably at an incline to near the top of the tank and divides the lower part of the cabinet into a clarifying chamber 13 and a settling chamber 14. Fixed to the top 6 and side walls 2 of the tank is a baffle member 15 extending downwardly and preferably inclined complementary to the baffle member 12 and terminating in the chamber 14 at a point below the upper end of the baffle 12. The arrangement of the baffles forms a trap in the tank for a purpose presently described. The lower ends of the chambers 13 and 14 comprise respective sumps 17 and 18, and drainage outlets 19 and 20 controlled by valves 21 and 22 respectively, are provided for the sumps. Ports, such as 23 and 24, are provided in the top, to prevent air from being trapped in the tank, for introduction of clarifying material and similar purposes.

The clarifying chamber 13 is partially filled with clarifying medium which may consist of a caustic solution or other clarifying solution designated 25.

A cleaning solvent, such as gasoline or the like is introduced into the chamber 13 through the inlet 7 for passage upwardly through the solution and over the tortuous path to the outlet, a reaction occurring between the solvent and the clarifying medium which cleanses the solvent and results in the formation of a precipitate product serving as a filter for the solvent. The precipitate product comes to rest adjacent the upper level of the clarifying material; and it is desirable that the gasoline be disseminated as uniformly as practicable throughout the clarifying material for both maximum contact with the material and also to avoid the disruption of the floating precipitate by a relatively small stream passing therethrough at relatively high speed. It is particularly desirable that the solvent, which is most conveniently introduced in a round stream through the inlet 7, be distributed over a relatively large portion of the cross sectional area of the chamber 13 before it is permitted to pass upwardly through the bath of clarifying medium.

The usual methods of breaking fluid up into a multiplicity of fine streams, such as the use of screens, perforate plates or pipes, are inapplicable because the orifices would rapidly become plugged by the fibrous material and gums carried by the solvent as dirt in this stage of the process.

I provide, therefore, a distributor 26 in the chamber 13 including preferably inclined side members 27 and 28 having ends closed as by welding the ends of the members to opposite side walls, similar edges 30 of the side members being spaced, and the opposite edges being joined, forming a peak 31 to provide a V-shaped chamber or trough.

The distributor is illustrated as comprising an inverted trough for distributing a solvent lighter in weight than the clarifying medium, the side members comprising a roof-like structure, and the free edges 30 being the lower edges of the members.

The side or roof members 27 and 28 therefore, constitute a receptacle to intercept and retain the solvent introduced through the inlet to cause the round stream of inlet solvent to spread out over the cross sectional area represented by the spaced lower edges of the roof members, displacing the cleansing medium of higher specific gravity and flowing over the said edges in sheet-like form into and through the clarifying material. Flange or baffle members 32 and 33 extend downwardly from the lower edges of the roof members and are preferably vertical and parallel, and provided with serrations or teeth 34. The distributor comprises, therefore, an inverted trough and the serrated flanges serve analogously to weir-like walls of a normal trough so that the solvent is distributed uniformly thereby over the entire length of the distributor since the solvent, being lighter than the clarifying solution in the sump, tends to rise rather than to fall to the bottom of the sump.

In operating the device the clarifying solution is introduced into the chamber 13 in suitable amounts and solvent is caused to flow through the inlet into the distributor. The in-flowing solvent displaces the solution that may have filled the distributor and spreads out over the area of the dstributor and flows under the serrated edges of the flanges in spaced and substantially equal streams into and upwardly through the clarifying medium because of the relatively parallel serrated edges of the distributor and their equal length and equal spacing from the opposite walls of the tank.

Each of the sheets of solvent tends to rise and spread out through the front and rear portions of the chamber 13 respectively, so that each sheet has a substantial area in which to spread for contacting clarifying material without intersecting the area occupied by solvent particles of the other sheet. The particles of solvent, therefore, have ample opportunity to intimately contact particles of the clarifying material and gasoline particles are effectively distributed for passing through the precipitate element over substantially the whole area thereof. Substantially all of the clarifying material is, therefore, contacted by the solvent and all of the solvent is thoroughly cleansed whereby both economy and effectiveness in the use of the material are brought about. The recleaned fluid passes over the baffle 12 into the chamber 14 and out of the tank through the slotted outlet 9.

It is apparent that, due to the inclined roof of the distributor, precipitated heavy matter will not lodge thereon but will slide off into the bottom of the vessel to be drained off through the drainage outlet 19.

What I claim and desire to secure by Letters Patent is:

1. In combination with a fluid-treating vessel having a treating agent chamber, a restricted inlet to the lower portion of the chamber, an outlet adjacent its top and baffles between the treating chamber and the outlet, a distributor extending transversely of the vessel and positioned to receive fluid from the inlet, the distributor having a closed top located adjacent said inlet and parallel lower edges having margins adjacent walls of the vessel, whereby the fluid is restrained for passage downwardly in the distributor and between said edges and adjacent vessel walls for dissemination to the treating agent.

2. In clarifying apparatus including a tank having an inlet in one side wall, an inverted trough comprising sides including diverging portions in receiving relation with the inlet and parallel vertical portions having serrated edges at the lower edges of the diverging portions below said inlet, the end edges of said sides being fixed to the side walls of the vessel.

3. In apparatus of the character described, in combination with a tank comprising side and end walls and an inclined bottom forming a sump, one of said side walls having an opening forming an inlet to the sump, a distributor comprising an inverted trough positioned in the tank to locate the inlet at the apex of the trough and having lower edges extending below said inlet and respectively closely adjacent an end wall and the inclined bottom of the vessel.

4. In clarifying apparatus including a tank including side and end walls and having a liquid inlet in one side wall adjacent its bottom and an outlet adjacent its top, a distributor comprising an inverted trough having ends fixed to the end walls of the tank with the apex of the trough in receiving relation with the inlet and side edges spaced substantially below said inlet and from the side walls of the tank for effecting downward flow of said liquid from the inlet to said trough edges and upward flow of the liquid in spaced streams adjacent said side walls.

In testimony whereof I affix my signature.

GWYNNE RAYMOND.